United States Patent [19]

Ebara et al.

[11] Patent Number: 5,371,132

[45] Date of Patent: Dec. 6, 1994

[54] POLYAMIDE RESIN COMPOSITION AND MOLDED ARTICLES OBTAINED THEREFROM

[75] Inventors: Kenji Ebara, Nobeoka; Hiroshi Nishino, Kawasaki, both of Japan

[73] Assignee: Asahi Kasei Kogyo Kabushiki Kaisha, Osaka, Japan

[21] Appl. No.: 80,153

[22] Filed: Jun. 23, 1993

[30] Foreign Application Priority Data

Jun. 25, 1992 [JP] Japan .................. 4-167600

[51] Int. Cl.$^5$ .................. C08K 7/06; C08K 3/34; C08K 3/22
[52] U.S. Cl. .................. 524/413; 524/425; 524/447; 524/449; 524/451; 524/494; 524/496; 524/606
[58] Field of Search .............. 528/339; 524/451, 449, 524/494, 413, 425, 496, 447, 606; 525/397

[56] References Cited

U.S. PATENT DOCUMENTS

| | | | |
|---|---|---|---|
| 2,887,462 | 5/1959 | Van Oot | 524/413 |
| 3,128,221 | 4/1964 | Flores | 528/339 |
| 3,318,827 | 5/1967 | Whittaker | 524/413 |
| 3,562,222 | 2/1971 | Ridgeway | 528/339 |
| 4,118,364 | 10/1978 | Nielinger et al. | 524/204 |
| 4,314,927 | 2/1982 | Theusohn | 524/606 |
| 4,314,929 | 2/1982 | Mahoney | 524/606 |
| 4,528,304 | 7/1985 | Yoshimura et al. | 524/606 |
| 4,603,166 | 7/1986 | Poppe et al. | 524/606 |
| 4,607,073 | 8/1986 | Sakashita et al. | 524/606 |
| 4,673,728 | 6/1987 | Nielinger et al. | 528/339 |
| 4,804,720 | 2/1989 | Tamura et al. | 524/606 |
| 4,985,102 | 1/1991 | Chatsick et al. | 524/606 |
| 5,039,746 | 8/1991 | Neagebauer et al. | 525/397 |

FOREIGN PATENT DOCUMENTS

| | | |
|---|---|---|
| 229144 | 1/1959 | Australia . |
| 0279342 | 2/1988 | European Pat. Off. . |
| 0291833 | 5/1988 | European Pat. Off. . |
| 5062959 | 5/1980 | Japan . |
| 61-60861 | 12/1986 | Japan . |
| 63-118367 | 5/1988 | Japan . |
| 2-265965 | 10/1990 | Japan . |
| 3-269056 | 11/1991 | Japan . |
| 4053871 | 2/1992 | Japan . |
| 4-149234 | 5/1992 | Japan . |
| 4149234 | 5/1992 | Japan . |
| WO93/01108 | 1/1993 | WIPO . |

OTHER PUBLICATIONS

Kitotsukuri, et al., "On the Structure and Some Properties of Nylon 66 Copolymers," *Sen-l Gakkaishi*, vol. 32, No. 5, p. 37 (1976).

Kiyotsukuri, et al., "On the Structure and Dynamic Viscoelasticity of Nylon Copolymers," *Sen-l Gakkaishi*, vol. 29, No. 12, p. 54 (1973).

French Search Report No. 9307692, dated 24 Jun. 1993.

*Primary Examiner*—Veronica P. Hoke
*Attorney, Agent, or Firm*—Pennie & Edmonds

[57] ABSTRACT

The present invention provides a polyamide resin composition which comprises:

(A), as a polyamide component, 30-95% by weight of a polyamide resin which is a half-aromatic polyamide comprising (a) 70-95% by weight of hexamethyleneadipamide unit obtained from adipic acid and hexamethylenediamine and (b) 5-30% by weight of hexamethyleneisophthalmide unit obtained from isophthalic acid and hexamethylenediamine and which has a sulfuric acid solution viscosity $\eta r$ of 1.5-2.8 and (B) 5-70% by weight of at least one inorganic filler selected from glass fiber, carbon fiber, mica, talc, kaolin, wollastonite, calcium carbonate and potassium titanate. Molded articles having a high surface gloss and comprising said resin composition are also provided.

4 Claims, 1 Drawing Sheet

POLYAMIDE RESIN COMPOSITION AND MOLDED ARTICLES OBTAINED THEREFROM

BACKGROUND OF THE INVENTION

1. Field of the Invention

The present invention relates to a polyamide resin composition and a molded article obtained therefrom and excellent in surface gloss. More particularly, it relates to a polyamide resin composition and a molded article obtained therefrom which are excellent in the surface gloss required for interior and exterior automotive trims, official appliance parts and sports and leisure goods and high in strength and rigidity and dimensional stability in the actual use and furthermore, excellent in characteristics such as thermal aging resistance, light resistance, discoloration resistance and light transmission.

2. Related Art

Recently, polyamide resins are increasingly utilized as interior or exterior structural members taking advantages of their excellent mechanical properties, high reinforcing effect obtained by reinforcing them with inorganic fillers such as glass fibers and excellent colorability and processability.

The high surface gloss, strength and rigidity and dimensional stability are performances required in common for structural members. Among them, the surface gloss is greatly influenced not only by the design of mold including the gate position, size and shape and molding conditions, but also by the flowability of resins in the mold and solidification conditions. Especially, compositions containing inorganic fillers such as glass fibers are apt to undergo deterioration of surface gloss due to the partial rising of the inorganic fillers to the surface of molded articles. Such molded articles having a low gloss are inferior in appearance, resulting in not only reduction of commercial value, but also deterioration of slidability with other materials.

For satisfying the high strength and rigidity and dimensional stability, it is generally known to incorporate inorganic fillers such as glass fibers into resins. However, it is known that when amount of the inorganic filler is increased in an attempt to increase the strength and rigidity and dimensional stability, the surface gloss of the molded articles deteriorates. Accordingly, in order to obtain molded articles excellent in gloss and besides high in strength and rigidity and dimensional stability, hitherto, the amount of the inorganic filler is reduced to such an extent that the filler does not rise to the surface and the reduction of strength and rigidity and dimensional stability caused by the reduction of the amount is compensated by contriving the shape of the articles, such as increase in wall thickness or strengthening with ribs.

On the other hand, resin materials which are not damaged in their surface gloss while increasing the amount of the inorganic fillers as much as possible have also been developed. They are proposed, for example, in Japanese Patent Kokoku No. 61-60861 and Japanese Patent Kokai Nos. 63-118367, 2-265965, 3-269056, 4-77554 and 4-149234.

Among them, as disclosed in Japanese Patent Kokai No. 2-265965, owing to absorption of water, the strength and rigidity of polyamide resins comprising the combination of only aliphatic polyamides such as nylon 6, nylon 66 and nylon 66/6 copolymers are greatly influenced by the temperature and humidity of the atmosphere where they are actually used and so these polyamide resins are restricted in their use.

Furthermore, as disclosed in Japanese Patent Kokoku No. 61-60861 and Japanese Patent Kokai Nos. 63-118367, 3-269056 and 4-149234, reduction in strength and rigidity due to absorption of water and in dimensional stability can be improved to some extent by using polyamide resins having monomer components containing an aromatic ring such as terephthalic acid and isophthalic acid. However, according to these techniques it has been difficult to obtain molded articles having satisfactorily high surface gloss because the resin compositions containing inorganic fillers are inferior in flowability or the solidification rate of the resins in the mold is high. In order to obtain molded articles of high surface gloss using these resins, there is a method of raising the mold temperature as high as possible, but there occurs a new problem that the molding time cycle is prolonged. Furthermore, as the larger mold is used, it becomes difficult to uniformly raise the temperature of the whole inside of the mold. Besides, in the case of the mold of complicated design having ribbed structure, locally high temperature area or locally low temperature area is formed and the resulting molded article have portions of high surface gloss and low surface gloss as a whole. Accordingly, for obtaining molded articles having high surface gloss over the whole surface, a resin composition capable of developing a high gloss in a wide mold temperature area is needed and none of the conventional materials have satisfied this requirement.

SUMMARY OF THE INVENTION

That is, there have been no resin compositions which simultaneously satisfy all of the high surface gloss in a wide molding condition and the high strength and rigidity and dimensional stability in actual use which are required for parts of structural materials and the object of the present invention is to provide a resin composition which satisfies all of these requirements and a molded article having excellent surface gloss obtained therefrom.

The inventors have conducted intensive research in an attempt to attain the above object and as a result, have found that a resin composition comprising very specific components and having a very specific compositional ratio can develop very high surface gloss over a very wide mold temperature area, is little in reduction of strength and rigidity after absorption of water and moreover has excellent dimensional stability at the time of molding. Thus, the present invention has been accomplished.

That is, the first aspect of the present invention is a polyamide resin composition for molding which comprises (A), as a polyamide component, 30–95% by weight of a polyamide resin which is a half-aromatic polyamide composed of (a) 70–95% by weight of a hexamethyleneadipamide unit obtained from adipic acid and hexamethylenediamine and (b) 5–30% by weight of hexamethyleneisophthalamide obtained from isophthalic acid and hexamethylenediamine and which has a sulfuric acid solution viscosity $\eta r$ of 1.5–2.8 and (B) 5–70% by weight of at least one inorganic filler selected from glass fiber, carbon fiber, mica, talc, kaolin, wollastonite, calcium carbonate and potassium titanate.

The second aspect is the above polyamide resin composition wherein said polyamide has a terminal carboxyl group ratio of at least 65% and contains a mixture of a copper compound and an iodine compound and/or a manganese compound in such a ratio as satisfying the following formulas (1)–(3):

$$0.5 \text{ ppm} \leq \text{copper} \leq 150 \text{ ppm} \quad (1)$$

$$20 \leq \text{iodine/copper} \leq 30 \text{ (gram atom ratio)} \quad (2)$$

$$0.5 \text{ ppm} \leq \text{manganese} \leq 60 \text{ ppm}. \quad (3)$$

The third aspect is the above polyamide resin composition additionally containing 5–80 parts by weight of a polyphenylene ether resin based on 100 parts by weight of the above polyamide resin.

The fourth aspect is a molded article made from the above polyamide resin composition and excellent in surface gloss.

DETAILED DESCRIPTION OF PREFERRED EMBODIMENTS

Figure 1:
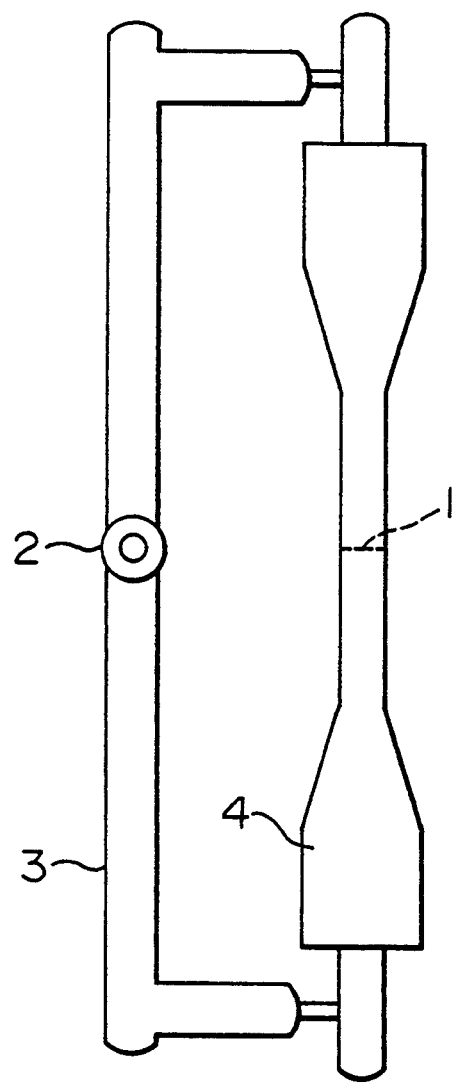
FIG. 1 shows a test piece for measuring strength of weld portion which was used in Examples and Comparative Examples. The reference numerals in FIG. 1 indicate the following.
1 Weld portion
2 Sprue
3 Runner
4 Test piece

The polyamide used in the present invention comprises a hexamethyleneadipamide unit (hereinafter referred to as "N66") obtained from adipic acid and hexamethylenediamine and a hexamethylene isophthalamide unit (hereinafter referred to as "N6I") obtained from isophthalic acid and hexamethylenediamine. The constituting ratio of the components is 70–95% by weight of N66 and 5–30% by weight of N6I, preferably 72–93% by weight of N66 and 7–28% by weight of N6I. If the amount of N6I is less than 5% by weight, strength and rigidity decrease in actual use upon absorption of water and furthermore molding shrinkage is large to cause problems such as warpage and distortion. Especially, the larger the molded article is, the greater the warpage is due to a slight difference in molding shrinkage. If the amount of N6I is more than 30% by weight, the inorganic filler is apt to rise to the surface of the molded article and satisfactory surface gloss cannot be obtained, for example, when the molding is carried out using a mold controlled in its temperature to lower than 100° C. with water. Furthermore, unless a sufficient cooling time for the resin in the mold is employed, the molded article cannot be released from the mold and the productivity lowers.

Thus, it is truly surprising that by copolymerizing an N6I component in an extremely restricted amount with N66 there can be obtained a polyamide resin composition which has both the two characteristics, namely, ① the molding shrinkage can be reduced and ② a molded article of high surface gloss can also be obtained by a mold having a temperature controlled with water. Such fact has never been expectable from the conventional techniques and has been found for the first time by the present invention.

The molecular weight of the polyamide used in the present invention is 1.5–2.8, preferably 1.6–2.7, more preferably 1.7–2.6 in terms of the viscosity $\eta r$ in sulfuric acid solution (measured in 100 ml of 95.5% sulfuric acid per 1 g of polymer at 25° C.). Improvement of the surface gloss of resin molded articles can also be attained by filling the resin composition in the mold in such a short time that the resin in the vicinity of the surface of the mold can sufficiently cover the inorganic filler without solidification. Therefore, it is preferred to use a polymer of high flowability, namely, a polyamide having a molecular weight of as low as possible. As a result of intensive research conducted on the molecular weight in such area as not causing deterioration of the properties and the surface gloss, it has been found that when polyamides of $\eta r = 1.5$–2.8 are used, very excellent strength and rigidity and surface gloss can be obtained. Thus, the molecular weight is set at the above range. If $\eta r$ is less than 1.5, the resin composition becomes brittle and further, drooling from the tip of the nozzle of cylinder occurs much at molding and molding becomes impossible. If $\eta r$ is more than 2.8, melt viscosity of the resin becomes too high and partial rising of the inorganic filler to the surface of the molded article occurs at the time of molding depending on the design of the mold used and the surface gloss decreases.

The polyamide used in the present invention is obtained by polycondensation reaction of the salts of adipic acid and isophthalic acid with hexamethytenediamine and the process of the reaction includes known melt polymerization, solid phase polymerization, bulk polymerization, solution polymerization or combinations thereof. Furthermore, the polyamide may also be obtained by solution polymerization or interfacial polymerization from adipic acid chloride and isophthatic acid chloride and hexamethylenediamine. Among them the melt polymerization or combination of the melt polymerization with the solid phase polymerization is preferred from economical viewpoint.

The inorganic filler used in the present invention is at least one inorganic filler selected from glass fiber, carbon fiber, mica, talc, kaolin, wollastonite, calcium carbonate and potassium titanate. Among them, preferred are glass fiber alone, combination of glass fiber and mica, combination of glass fiber and kaolin or calcined kaolin, combination of glass fiber, talc and kaolin or calcined kaolin, kaolin or calcined kaolin alone, talc alone, combination of talc and kaolin or calcined kaolin, mica alone, wollastonite alone, carbon fiber alone, and combination of glass fiber and carbon fiber. As the glass fibers, those which are normally used for thermoplastic resins can be used and they have no special limitations in diameter and length. Any of chopped strands, rovings and milled fibers may be used. The inorganic fillers may be applied with known silane coupling agents on the surface. The amount of the inorganic filler added is 5–70% by weight, preferably 10–65% by weight. If the amount is less than 5% by weight, reinforcing effect of the inorganic fillers cannot be sufficiently exhibited and satisfactory strength and rigidity cannot be obtained. If it is more than 70% by weight, flowability of the resin is inferior and it becomes difficult to fill the resin in the thin wall portion and further, it becomes difficult to obtain molded articles of good surface gloss using any molds.

The composition of the present invention is required to have excellent thermal aging resistance and light resistance since it is sometimes used under high temperature atmosphere or under exposure to sunlight depending on the use. Taking these points into consideration, the inventors have further made investigation and as a result, it has been found that a resin composition which is not only improved in thermal aging resistance and light resistance, but also less in discoloration with time as compared with the conventional polyamide resin materials can be obtained by combining a polyamide resin having a specific terminal group ratio with a specific amount of copper, iodine and manganese compounds. That is, the conventional polyamide resin compositions containing copper, iodine and manganese compounds are improved in thermal aging resistance and light resistance to some extent, but have the problems that the polyamide resins discolor owing to absorption of water or owing to heat or light deterioration. Especially, in the use for structural materials where resins colored in various colors are used, discoloration of the surface is a fatal defect and materials which show the least discoloration are demanded.

The resin composition having excellent thermal aging resistance and light resistance and besides less in discoloration with time which is the second aspect of the present invention will be explained below.

The terminal carboxyl group ratio of the polyamide resin in the present invention (which is the ratio of the terminal carboxyl group concentration to the total of the terminal carboxyl group concentration [COOH] and the terminal amino group concentration [NH$_2$]: $\{[COOH]/([COOH]+[NH_2])\} \times 100$ (%)) must be at least 65%, preferably at least 70%. If the ratio is less than 65%, the resin molded articles discolor to yellowish green. For controlling the terminal carboxyl group concentration of the polyamide, there are the following methods. That is, to the aqueous solutions of salts of equimolar adipic acid and isophthalic acid and hexamethylenediamine before starting of polymerization are further added a monocarboxylic acid or a dicarboxylic acid or the polymerization of the aqueous solutions of the equimolar salts is started and the hexamethylenediamine component is removed from the reaction system in the course of the polymerization. Furthermore, the terminal carboxyl group concentration can also be controlled by directly reacting the polyamide with a compound of monocarboxylic acid or dicarboxylic acid in an extruder or a kneader. As the monocarboxylic acids or dicarboxylic acids used for control of the terminal functional group concentration, mention may be made of aliphatic carboxylic acids represented by CH$_3$(CH$_2$)$_n$COOH (n=0–30) and HOOC(CH$_2$)$_n$COOH (n=0–30), aromatic carboxylic acids such as benzoic acid, toluic acid, isophthalic acid and terephthalic acid, naphthalene ring-containing carboxylic acids such as naphthalenedicarboxylic acid and cyclohexane ring-containing carboxylic acids.

As examples of the copper compound, mention may be made of copper chloride, copper bromide, copper iodide, copper phosphate, copper ammonium complex, copper stearate, copper montanate, copper adipate, copper isophthalate, copper terephthalate, copper benzoate, copper pyrophosphate, copper acetate and copper ammonia. Preferred are copper bromide, copper iodide and copper acetate. The copper compound is added in such an amount that the amount of the copper element is 0.5 to 150 ppm, preferably 0.7 to 140 ppm based on the polyamide. If it is less than 0.5 ppm, sufficient thermal aging resistance and light resistance cannot be obtained. If it is more than 150 ppm, post-discoloration of the resin due to absorption of water is conspicuous.

The iodine compound includes, for example, potassium iodide, magnesium iodide and ammonium iodide and simple iodine may also be used. Potassium iodide is preferred. The iodine compound is added in such an amount that the gram atomic ratio of iodine element and copper element ([iodine]/[copper]) is 20 to 30, preferably 22 to 28. If it is less than 20, sufficient thermal aging resistance and light resistance cannot be obtained and furthermore, post-discoloration of the resin due to absorption of water is conspicuous. If it is more than 30, corrosion of metals such as polymerization reactors, extruders and molding machines and corrosion of metals inserted in the molded articles can occur with ease.

The manganese compound includes, for example, manganese lactate and manganese pyrophosphate. The manganese compound is added in such an amount that the amount of the manganese element is 0.5 to 60 ppm, preferably 0.7 to 55 ppm based on the polyamide. If it is less than 0.5 ppm, sufficient light resistance cannot be obtained. If it is more than 60 ppm, there is no special problem, but it need not be added in such an amount more than required since sufficient light resistance is obtained by the combination of the copper compound and the iodine compound.

The method for incorporation of the copper compound, the iodine compound and the manganese compound into the polyamide resin is unlimited and they are incorporated by known methods, for example, by dissolving the respective compounds in the aqueous solution of the salt of a dicarboxylic acid and a diamine and carrying out the polymerization of the polyamide, or by adding the respective compounds in the course of the polymerization of the polyamide, or by kneading the respective compounds into the molten polyamide resin in a single screw or twin screw extruder or a kneader.

The resin composition of the present invention which comprises a polyamide resin and an inorganic filler is much superior to the conventional polyamide resin materials in all of the surface gloss of the molded articles obtained therefrom and strength and rigidity and dimensional stability in actual use. However, the inventor have made further research in an attempt to improve the strength and rigidity and the dimensional stability in actual use and as a result have found that a resin composition further markedly improved in these properties without damaging the surface gloss of molded articles can be obtained.

The third aspect of the present invention will be explained in detail below.

The polyphenylene ether resin used in the present invention is a polymer comprising the structural unit represented by the following formula:

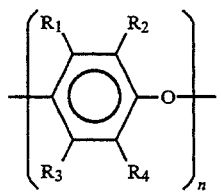

(wherein R$^1$, R$^2$, R$^3$ and R$^4$ each represents hydrogen, a halogen atom, an alkyl group or an aryl group and n represents a polymerization degree). Examples of the polymer are (2,6-dimethyl-1,4-phenylene ether), poly(2,6-diethyl-1,4-phenylene ether), poly(2,6-dipropyl-1,4-phenylene ether), poly(2-methyl-6-ethyl-1,4-phenylene ether), poly(2-ethyl-6-propyl-1,4-phenylene ether), poly(2,6-diallyl-1,4-phenylene ether), poly(2-methyl-6-allyl-1,4-phenylene ether), poly(2,6-dichloro-1,4-phenylene ether), poly(2,6-dibromo-1,4-phenylene ether), poly(2-chloro-6-bromo-1,4-phenylene ether), poly(2,6-difluoro-1,4-phenylene ether), poly(2,3,6-trimethyl-1,4-phenylene ether) and poly(2,3,5,6-tetrabromo-1,4-phenylene ether) and copolymers thereof.

The amount of the polyphenylene ether resin added is 5–80 parts by weight, preferably 10–75 parts by weight based on 100 parts by weight of the polyamide resin. If it is less than 5 parts by weight, the effects of improving the strength and rigidity and the dimensional stability in actual use are small and if it is more than 80 parts by weight, the flowability decreases and accordingly the surface gloss of the molded articles also decreases. Furthermore, chemical resistance to oils and others decreases and the use is restricted.

When a modified styrene polymer prepared by grafting maleic acid on a polystyrene and/or a modified polyphenylene ether resin prepared by grafting maleic acid on polyphenylene ether is added at the time of mixing the polyphenylene ether resin with the polyamide, strength of the weld portions which often becomes a problem for molded articles can be improved.

The modified styrene polymer is a polymer obtained by grafting an $\alpha,\beta$-unsaturated carboxylic acid or a derivative thereof on a polymer mainly composed of an aromatic vinyl compound in the presence or absence of a radical former. The aromatic vinyl compound used here includes, for example, styrene, vinyltoluene, vinylnaphthalene, monochlorostyrene, dichlorostyrene, trichlorostyrene, monobromostyrene, dibromostyrene and tribromostyrene. One or two or more are polymerized. Styrene is especially preferred.

The modified polyphenylene ether resin is a polymer obtained by grafting an $\alpha,\beta$-unsaturated carboxylic acid or a derivative thereof on a polyphenylene ether in the presence or absence of a radical former.

The radical former includes peroxide radical formers such as benzoyl peroxide, dicumyl peroxide, di-t-butyl peroxide, 1,1-bis(t-butylperoxy) 3,3,5-trimethylcyclohexane and 2,5-dimethyl-di(t-butylperoxy)-hexane.

As examples of the $\alpha,\beta$-unsaturated carboxylic acid and derivatives thereof, mention may be made of maleic acid, maleic anhydride, succinic acid, succinic anhydride, himic acid, himic anhydride, itaconic acid, itaconic anhydride, citraconic anhydride, aconitic anhydride, monomethyl maleate, monoethyl maleate, a metal salt of monoethyl maleate, monoethyl fumarate, vinylbenzoic acid, vinylfumaric acid, a metal salt of monoethyl fumarate, glycidyl methacrylate, glycidyl acrylate, allyl glycidyl ether, vinyl glycidyl ether, glycidyl itaconate, acrylic acid, methacrylic acid and maleimide. Especially preferred are those which have an acid anhydride group. The grafting amount of the $\alpha,\beta$-unsaturated carboxylic acid or derivatives thereof is preferably in the range of 0.01–50 mol %. If the grafting amount is more than 50 mol %, undesirable results such as coloration, decrease of molecular weight and gelation of the resin are brought about. If it is less than 0.01 mol %, the effect to improve the strength of weld portion is not seen.

When the modified styrene polymer or the modified styrene polymer and the modified polyphenylene ether resin are added, the amount thereof is preferably 1–50% by weight based on the polyphenylene ether resin and the amount of the modified polyphenylene ether resin is preferably 1–100% by weight.

It has been further found that the resin composition of the present invention which comprises the polyamide resin, the polyphenylene ether resin and the inorganic filler has surprisingly the effect to improve the transparency of the molded articles in addition to the effect to improve the aforementioned properties. That is, molded articles made from the composition comprising the polyphenylene ether resin and the conventional polyamides such as polycapramide (Ny6), polyhexamethyleneadipamide (Ny66), copolymer of polycapramide and polyhexamethyleneadipamide (Ny66/6), copolymer of polyhexamethyleneadipamide and polyhexamethyleneterephthalamide (Ny66/6T) and copolymer of polyhexamethyleneterephthalamide and polyhexamethyleneisophthalamide (Ny6T/6I) have no light transmissibility while the molded articles obtained from the resin composition of the present invention are very high in light transmission and even when inorganic fillers are added in a high concentration, the light transmission is sufficiently maintained. These facts are never expectable from the techniques on the conventional compositions comprising a polyamide and a polyphenylene ether resin and have been elucidated for the first time by the present invention. Therefore, the composition of the present invention is markedly suitable for molded articles such as tanks and bottles through which the level of liquid contained therein should be externally observed.

For these uses, resin compositions of high light transmittance are needed, but molded articles of high surface gloss are also desired because the light transmission further decreases when the inorganic fillers project over the surface of the molded articles. According to the conventional techniques, when the light transmission is regarded as important, non-crystalline or low-crystalline resins have been utilized, but these resins suffer from the problem of inferior chemical resistance. On the other hand, when the chemical resistance is regarded as important, crystalline resins have been utilized, but in this case the light transmission deteriorates and sufficient light transmission can be obtained only for thin wall molded articles and thus, the strength and rigidity of the molded articles is sacrificed.

The present invention has solved the above problems at a stroke and the resin composition is excellent in all of surface gloss, strength and rigidity, dimensional stability, chemical resistance and light transmission of the molded articles.

The fourth aspect of the present invention will be explained.

The molded article excellent in surface gloss in the present invention means such a molded article that the whitening phenomenon caused by rising of the inorganic fillers to the surface of the article is not visually recognized and furthermore, the area of the portion having a value of 50 gloss or higher when measured on the surface of the molded article by a gloss meter (JIS K-7105) occupies at least 90% of the whole surface area of the molded article.

The molded articles having a high surface gloss of the present invention are utilized for those which are required to have excellent appearance and those which have the parts sliding with other materials and are required to have sliding properties.

Examples of such uses are furnitures such as legs and seats of chairs, legs of desks, and parts of cabinets and wagons, office appliances such as housings for notebook type personal computers, interior and exterior automotive trims such as door mirror stay, wheel rim, wheel cap, wiper, motor fan, seat lock parts, gear, lamp housing, spoiler, ornament cover, relay block, sliding switch, inhibitor switch, combination switch lever, oil reservoir tank and fuel tank, electrical goods such as pulley, gear and housing for hot-air apparatuses, and besides, bicycle parts such as wheel rim, wheel spoke, saddle, saddle post, handle, stand and deck, valve housing, nail, screw, bolt, bolt nut, tank and bottle.

The resin composition of the present invention may additionally contain antioxidant, ultraviolet absorber, heat stabilizer, light detrioration inhibitor, colorants such as dye and pigment, plasticizer, lubricant, releasing agent, nucleating agent and flame retarder which are customarily added to polyamide resins and in addition, other polyamide resins or other thermoplastic resins may also be blended with the composition.

The following nonlimiting examples explain the present invention in more detail.

The evaluations of the samples in examples and comparative examples were carried out by the following methods.

(1) Relative viscosity ($\eta r$): The polymer was dissolved at a concentration of 1.0 g/dl in 95.5±0.03% sulfuric acid and the relative viscosity was measured at 25° C. by Ostwald viscosity tube.

(2) Terminal carboxyl group ratio: The polymer was dissolved in a 90% aqueous phenol solution and titrated with 1/40N hydrochloric acid to obtain amino group concentration (25° C.) ([NH$_2$]). The polymer was dissolved in benzyl alcohol and titrated with 1/10N solution of KOH in ethylene glycol to obtain carboxyl group concentration (phenolphthalein was used as an indicator) (160° C.) ([COOH]). The terminal carboxyl group ratio was calculated from the amino group concentration ([NH$_2$]) and the carboxyl group concentration ([COOH]) using the following formula.

The terminal carboxyl group ratio =

$$\frac{[COOH]}{[COOH] + [NH_2]} \times 100(\%)$$

(3) Tensile properties: ASTM D638
(4) Flexural properties: ASTM D790
(5) Surface gloss: A plate of 130 mm×130 mm×3 mm thick was molded by an injection molding machine IS150E manufactured by Toshiba Machine Co., Ltd. with a gate size of 2 mm×3 mm when the amount of the inorganic filler is 33 wt % or less and 6 mm×3 mm when it is more than 33 wt % under the molding conditions of cylinder temperature: 290° C., mold temperature: 80° C. and 120° C., injection/cooling cycle: 10/20 seconds, injection pressure: 350 kg/cm$^2$, and injection rate: 50%. The gloss of the surface of the resulting molded article was measured in accordance with JIS K7105 using a handy gloss meter IG320 manufactured by Horiba Co., Ltd.
(6) Dimensional properties: Using the molded article obtained in the evaluation of the surface gloss, the size of the resin in the flowing direction was obtained and the dimensional changing rate to the size of the mold was obtained by the following formula.

Rate of dimensional change={[(size of mold)−(size of molded article)]/(size of mold)}×100 (%)

(7) Conditions for equilibration of water absorption: The molded article was left to stand in an atmosphere of 23° C. and 50% RH until the water absorption rate reached equilibrium.
(8) Water absorption rate: Weight of the test piece just after molded and weight of the test piece after absorbing water were measured and the water absorption rate was calculated by the following formula.

Water absorption rate =

$$\frac{\begin{pmatrix}\text{(weight of} \\ \text{test piece which} \\ \text{absorbed water)}\end{pmatrix} - \begin{pmatrix}\text{(weight of} \\ \text{test piece which} \\ \text{absorbed water)}\end{pmatrix}}{\text{(Weight of test piece just after molded)}} \times 100(\%)$$

(9) Thermal aging resistance: An molded piece (3 mm thick) was placed in an oven controlled to 180° C. and the time required before the tensile strength reached a retention rate of 50% was obtained,
(10) Light resistance: A molded piece (3 mm thick) was placed in a sunshine weatherometer (at 63° C. with showering for 18 minutes during 2 hours and using a xenon lamp as a light source) and subjected to exposure for 3000 hours. The surface of the exposed piece was observed to examine occurrence of cracks and degree of discoloration of the surface as compared with the molded piece before exposure.
(11) Strength of weld portion: Tensile strength was obtained in accordance with ASTM D638 using the test piece for measuring the strength of the weld portion as shown in FIG. 1.
(12) Transmission: A box type molded article having a thickness of 3 mm was made and water was filled therein. It was visually judged whether the surface of the water can be externally seen or not.

The following polymers and starting materials were used in the examples and comparative examples.

[1] Polymers

① Polyhexamethyleneadipamide (Ny66): LEONA 1300 and LEONA 1200 manufactured by Asahi Kasei Kogyo K.K.

② Copolymer of polyhexamethyleneadipamide and polyhexamethyleneisophthalamide (Ny66/6I): This was prepared in accordance with Preparation Example 1.

③ Copolymer of polyhexamethyleneadipamide and polycapramide (Ny66/6), copolymer of polyhexamethyleneadipamide and polyhexamethyleneterephthalamide (Ny66/6T), copolymer of polyhexamethyleneadipamide, polyhexamethyleneterephthalamide and polyhexamethyleneisophthalamide (Ny66/6T/6I), poly-m-xylyleneadipamide (NyMXD6): These were prepared in accordance with Preparation Example 1 using as the starting materials an equimolar salt of adipic acid and hexamethylenediamine, ε-caprolactam, an equimolar salt of isophthalic acid and hexamethylenediamine, an equimolar salt of terephthalic acid and hexamethylenediamine, and an equimolar salt of m-xylylenediamine and adipic acid.

④ Copolymer of polyhexamethyleneisophthalamide and polyhexamethyleneterephthalamide (Ny6I/6T), polyhexamethyleneisophthalamide (Ny6I): These were prepared in accordance with Preparation Example 2 using as the starting materials an equimolar salt of isophthalic acid and hexamethylenediamine and an equimolar salt of terephthalic acid and hexamethylenediamine.

⑤ Polycapramide (Ny6): Product manufactured by Asahi Kasei Kogyo K.K.

⑥ Polyphenylene ether (PPE): Product manufactured by Asahi Kasei Kogyo K.K.

⑦ Maleic anhydride-grafted polystyrene (compatilizer C1): This was prepared in accordance with Preparation Example 3.

⑧ Maleic anhydride-grafted polyphenylene ether (compatilizer C2): This was prepared in accordance with Preparation Example 4.

[2] Inorganic Fillers

① Glass fiber (GF): 03JA416 manufactured by Asahi Fiber Glass Co., Ltd.

② Talc: CRS6002 manufactured by Tatsumori K.K.

③ Calcined kaolin: SATINTONE W manufactured by Engelhart Co.

④ Mica: M-400T manufactured by Lepco Co.

⑤ Carbon fiber (CF): Hi-Carbolon A-9000 manufactured by Shin Asahi Kasei Carbon Fiber K.K.

Preparation Example 1

2.00 kg of an equimolar salt of adipic acid and hexamethylenediamine, 0.50 kg of an equimolar salt of isophthalic acid and hexamethylenediamine and 2.5 kg of pure water were charged in a 5L autoclave and were well stirred. After the atmosphere therein was sufficiently replaced with $N_2$, the temperature was elevated from room temperature to 220° C. over a period of about 1 hour with stirring. The inner pressure reached 18 kg/cm$^2$-G due to spontaneous pressure generated by water vapor in the autoclave and heating was continued with removing water from the reaction system so that the inner pressure did not exceed 18 kg/cm$^2$-G. After heating for additional 2 hours, when the inner temperature reached 260° C., the heating was discontinued and the discharge valve of the autoclave was closed and the content was cooled to room temperature over a period of about 8 hours. Thereafter, the autoclave was opened and about 2 kg of the polymer was taken out and ground. The resulting ground polymer was put in a 10L evaporator and was subjected to solid phase polymerization at 200° C. for 10 hours in an $N_2$ stream. As a result of the solid phase polymerization, the sulfuric acid relative viscosity $\eta r$ (polymer 1 g/100 ml of 95.5% sulfuric acid, measured at 25° C.) increased from 1.38 to 2.30.

Preparation Example 2

1.75 kg of an equimolar salt of isophthalic acid and hexamethylenediamine, 0.75 kg of an equimolar salt of terephthalic acid and hexamethylenediamine and 2.5 kg of pure water were charged in a 5L autoclave and were well stirred. After the atmosphere therein was sufficiently replaced with $N_2$, the temperature was elevated from room temperature to 250° C. over a period of about 2 hour with stirring. The inner pressure reached 25 kg/cm$^2$-G due to spontaneous pressure generated by water vapor in the autoclave and heating was continued with removing water from the reaction system so that the inner pressure did not exceed 25 kg/cm$^2$-G. After heating for additional 2 hours, when the inner temperature reached 300° C., the inner pressure was gradually reduced to atmospheric pressure over a period of about 1 hour. The reaction was allowed to proceed for further 1 hour at an inner temperature of 300° C. and under atmospheric pressure. Thereafter, the heater was switched off and the reaction product was cooled to room temperature over about 8 hours. After cooling, the autoclave was opened and about 2 kg of the polymer was taken out and ground. The resulting ground polymer was dried at 100° C. for 24 hours in an $N_2$ stream.

Preparation Example 3

104 g of polystyrene (manufactured by Wako Junyaku Co. Ltd.) and 98 g of maleic anhydride were dissolved in 400 ml of o-dichlorobenzene and the solution was heated and stirred at 120° C. in a dry nitrogen stream. Then, thereto was slowly added a solution prepared by dissolving 20 g of benzoyl peroxide diluted to 50% with dioctyl terephthalate ("NYPER BO" manufactured by Nippon Oil & Fats Co., Ltd.) in 40 ml of o-dichlorobenzene and reaction was allowed to proceed at 120° C. for 6 hours in a dry nitrogen stream. After completion of the reaction, 500 ml of o-dichlorobenzene was further added to dilute the reaction mixture. Then, the reaction mixture was introduced into acetone to precipitate a polymer. The polymer was sufficiently washed with acetone and vacuum dried at 80° C. to obtain the desired product. The grafting amount of maleic anhydride was measured by titration with sodium methylate to find that 1.7 mol % of maleic anhydride was grafted on the polystyrene.

Preparation Example 4

36.4 g of polyphenylene ether and 29.4 g of maleic anhydride were dissolved in 200 ml of p-xylene and the solution was heated and stirred at 120° C. in a dry nitrogen stream. Then, to the solution was slowly added a solution prepared by dissolving 5.8 g of benzoyl peroxide diluted to 50% with dioctyl terephthalate ("NYPER BO" manufactured by Nippon Oil & Fats Co., Ltd.) in 50 ml of p-xylene and reaction was allowed to proceed at 120° C. for 5 hours in a dry nitrogen stream. After completion of the reaction, 200 ml of p-xylene was further added to dilute the reaction mixture. Then, the reaction mixture was introduced into acetone to precipitate a polymer. The polymer was sufficiently washed with acetone and vacuum dried at 80° C. to obtain the desired product. The grafting amount of maleic anhydride was measured by titration with sodium methylate to find that 1.2 mol % of maleic anhydride was grafted on the polyphenylene ether.

Preparation Example 5

Kneading of the polymer with inorganic filler was conducted in the following manner.

The cylinder temperature of a twin screw extruder (ZSK 25 manufactured by Werner Co.) was set at 280° C. and the polymer was introduced into the extruder from a hopper at a screw revolution speed of 100 rpm. The inorganic filler was fed at the middle of the cylinder. When two or more inorganic fillers were used, they were also fed at the middle of the cylinder separately. To the inorganic fillers other than GF was previously allowed to adhere 1 phr of γ-aminopropyltriethoxysilane. The polymer and inorganic filler introduction ports were sufficiently purged with $N_2$ and the part immediately before the discharging port of the extruder was drawn to a vacuum by venting (650 mmHg). The discharging amount was 8.0–10 kg/HR and the resin temperature was 290°–315° C.

The resulting pellets were blended with 0.13 phr of sodium montanate and molded.

EXAMPLES 1–13

Molded pieces comprising the compositions shown in Tables 1 and 2 were prepared and appearance, tensile properties, flexural properties and dimensional change of the molded pieces were measured (Tables 1 and 2). All of the compositions were small in dependence of appearance on the mold temperature, had excellent surface gloss, small in decrease of strength and modulus of elasticity due to absorption of water and small in dimensional change of molded articles at the time of molding.

Comparative Examples 1–4 and 17

Compositions comprising Ny66 polymer and reinforced by the inorganic fillers as shown in Table 3 were prepared and evaluated in the same manner as above. Molded articles high in surface gloss were not obtained from these materials by the molding under the conditions mentioned above even when the mold temperature was raised. In addition, decrease in strength and modulus of elasticity due to absorption of water was great and dimensional change was also large.

Comparative Examples 5–7 and 10

GF-reinforced compositions comprising Ny6, Ny66/6 copolymer and Ny66/Ny6 blend polymer which were generally used as materials having good appearance were prepared and evaluated. Molded articles of high surface gloss were obtained from these materials, but the molded articles were low in strength and modulus of elasticity upon absorption of water (Tables 3 and 4).

Comparative Examples 8, 9, 11, 12, 14 and 16

GF-reinforced compositions comprising the known polyamides containing an aromatic ring component were prepared and evaluated. From these materials there were obtained molded articles high in strength and modulus of elasticity upon absorption of water and small in dimensional change, but they were low in surface gloss and furthermore large in dependence of the gloss on the mold temperature. The surface gloss was insufficient in uniformity when the whole molded article was seen and partial whitening phenomenon occurred due to the rising of the inorganic filler to the surface depending on the kinds of the mold used. These problems cause reduction of commercial value and deterioration of slidability with other materials.

Comparative Example 13

A Ny66/6I polymer comprising 50 wt % of the Ny6I component was prepared and GF-reinforced composition was obtained therefrom in the same manner as above. As shown in Table 4, when the content of the Ny6I component exceeded the range of the present invention, the surface gloss abruptly deteriorated.

Comparative Example 15

A GF-reinforced composition comprising Ny66/6I having a $\eta r$ of 3.20 was prepared. As shown in Table 4, when the molecular weight was too high, flowability deteriorated and the composition was not able to be filled in the mold under the molding conditions mentioned above.

Comparative Example 18

A 50% GF-reinforced composition comprising Ny66/6I (80/20 wt %) polymer having a relative viscosity $\eta r$ of 1.40 was similarly prepared. However, drooling from the tip of the cylinder nozzle of the molding machine occurred much at molding and it was utterly impossible to perform molding.

Comparative Example 19

A 75% GF-reinforced composition comprising Ny66/6I (80/20 wt %) polymer having a relative viscosity $\eta r$ of 2.20 was similarly prepared. However, flowability of the resin composition was inferior and the composition was not able to be filled in the mold. Thus, no molded article was able to be obtained.

EXAMPLES 14–22

In the Preparation Example 1, each of aqueous solutions of copper iodide, potassium iodide and manganese lactate was added before starting of the polymerization at the concentration as shown in Table 5 and the polymerization was started. The control of the carboxyl group ratio was carried out by further adding adipic acid to the aqueous solution of equimolar salt. Into the resulting polymer was incorporated 33% of GF in the same manner as in Preparation Example 5.

The resulting composition was molded and tensile properties, flexural properties, appearance, dimensional change, light resistance and thermal aging resistance of the molded articles were measured. The results are shown in Table 5.

Comparative Examples 20–26

Preparation and evaluation of the compositions were carried out in the same manner as above. The results are shown in Table 6.

EXAMPLES 23–30

The Ny66/6I obtained in Preparation Example 1, PPE polymer and the mixing agent C1 or C2) were preblended at the ratio as shown in Table 7 and GF-reinforced compositions were prepared therefrom under the same extrusion conditions as in Preparation Example 5.

Tensile properties, flexural properties, appearance, dimensional change, weld strength and transmission of the molded articles were evaluated. The results are shown in Table 7.

Comparative Examples 27–29

Preparation and evaluation of the compositions were carried out in the same manner as above. The results are shown in Table 7.

As explained above, the present invention provides a resin composition high in the surface gloss required for structural members under molding conditions of a wide range and excellent in strength rigidity and dimensional stability in actual use and a resin composition imparted with the characteristics such as light resistance, thermal aging resistance and transmission in addition to the above characteristics and further provides molded articles excellent in surface gloss which comprise the above composition.

TABLE 1

| Item | | Unit | Example 1 | Example 2 | Example 3 | Example 4 | Example 5 | Example 6 | Example 7 | Example 8 |
|---|---|---|---|---|---|---|---|---|---|---|
| Kind of polymer (Compositional ratio) | | (WT %) | Ny66/6I (80/20) | Ny66/6I (90/10) | Ny66/6I (75/25) | Ny66/6I (80/20) | Ny66/6I (80/20) | Ny66/6I (80/20) | Ny66/6I (80/20) | Ny66/6I (80/20) |
| $\eta r$ | | | 2.20 | 2.40 | 2.25 | 1.70 | 2.33 | 2.50 | 2.60 | 2.35 |
| Kind and amount of inorganic filler | | | GF 50% | GF 50% | GF 50% | GF 50% | GF 42% | GF 33% | GF 15% | GF 30% mica 30% |
| Appearance | Mold temperature 80° C. | gloss | 80 | 78 | 85 | 88 | 90 | 85 | 90 | 75 |
| | Mold temperature 120° C. | gloss | 85 | 80 | 88 | 91 | 92 | 89 | 93 | 80 |
| Just after molding | Tensile strength | kg/cm$^2$ | 2,570 | 2,470 | 2,580 | 2,400 | 2,300 | 1,950 | 1,250 | 2,100 |
| | Flexural strength | kg/cm$^2$ | 3,740 | 3,700 | 3,750 | 3,700 | 3,300 | 2,860 | 1,800 | 3,000 |
| | Flexural modulus of elasticity | kg/cm$^2$ | 150,000 | 145,000 | 152,000 | 150,000 | 130,000 | 104,000 | 55,000 | 181,000 |
| After equilibration of water absorption | Tensile strength | kg/cm$^2$ | 2,270 | 2,150 | 2,280 | 2,300 | 2,150 | 1,760 | 1,100 | 1,950 |
| | Flexural strength | kg/cm$^2$ | 3,430 | 3,120 | 3,430 | 3,500 | 3,150 | 2,400 | 1,550 | 2,900 |
| | Flexural modulus of elasticity | kg/cm$^2$ | 160,000 | 135,000 | 159,800 | 162,000 | 128,000 | 95,000 | 4,700 | 180,000 |
| | Water absorption rate | % | 0.91 | 0.98 | 0.88 | 0.90 | 1.10 | 1.25 | 1.60 | 0.75 |
| Dimensional change | | % | 0.52 | 0.54 | 0.48 | 0.53 | 0.59 | 0.64 | 0.90 | 0.35 |

TABLE 2

| Item | | Unit | Example 9 | Example 10 | Example 11 | Example 12 | Example 13 |
|---|---|---|---|---|---|---|---|
| Kind of polymer (Compositional ratio) | | (WT %) | Ny66/6I (80/20) | Ny66/6I (80/20) | Ny66/6I (80/20) | Ny66/6I (80/20) | Ny66/6I (80/20) |
| $\eta r$ | | | 2.30 | 2.33 | 2.40 | 2.33 | 2.30 |
| Kind and amount of inorganic filler | | | talc 17% calcined kaolin 21% | GF 10% calcined kaolin 21% | GF 20% talc 11% calcined kaolin 13% | GF 15% CF 10% | CF 15% |
| Appearance | Mold temperature 80° C. | gloss | 86 | 87 | 80 | 80 | 86 |
| | Mold temperature 120° C. | gloss | 90 | 91 | 83 | 88 | 90 |
| Just after molding | Tensile strength | kg/cm$^2$ | 1,050 | 1,300 | 1,480 | 2,000 | 1,800 |
| | Flexural strength | kg/cm$^2$ | 1,700 | 2,000 | 2,100 | 3,000 | 2,700 |
| | Flexural modulus of elasticity | kg/cm$^2$ | 70,000 | 68,000 | 98,000 | 110,000 | 100,000 |
| After equilibration of water absorption | Tensile strength | kg/cm$^2$ | 900 | 1,200 | 1,300 | 1,800 | 1,650 |
| | Flexural strength | kg/cm$^2$ | 1,500 | 1,850 | 1,900 | 2,850 | 2,550 |
| | Flexural modulus of elasticity | kg/cm$^2$ | 58,000 | 60,000 | 90,000 | 100,000 | 93,000 |
| | Water absorption rate | % | 1.12 | 1.10 | 1.08 | 1.28 | 1.50 |
| Dimensional change | | % | 0.45 | 0.50 | 0.46 | 0.90 | 0.75 |

TABLE 3

| Item | | Unit | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|
| Kind of polymer | | (WT %) | Ny66 | Ny66 | Ny66 | Ny66 | Ny6 | Ny66/6 | Ny66/Ny6 | Ny66/6T | Ny6I/6T |
| (Compositional ratio) | | | | | | | | (90/10) | | | |
| $\eta r$ | | | 2.30 | 2.62 | 2.64 | 2.64 | 2.33 | 2.34 | 2.63 | 2.33 | 2.24 |
| Kind and amount of inorganic filler | | | GF 50% | GF 42% | GF 33% | GF 15% | GF 50% | GF 50% | GF 50% | GF 50% | GF 50% |
| Appearance | Mold temperature 80° C. | gloss | 7 | 10 | 11 | 18 | 75 | 63 | 56 | 20 | 15 |
| | Mold temperature 120° C. | gloss | 12 | 15 | 18 | 22 | 80 | 75 | 62 | 32 | 20 |
| Just after | Tensile strength | kg/cm$^2$ | 2,380 | 2,200 | 1,900 | 1,150 | 2,300 | 2,440 | 2,400 | 2,400 | 2,450 |

TABLE 3-continued

| Item | | Unit | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|
| molding | Flexural strength | kg/cm$^2$ | 3,520 | 3,200 | 2,700 | 1,750 | 3,400 | 3,650 | 3,620 | 3,620 | 3,700 |
| | Flexural modulus of elasticity | kg/cm$^2$ | 148,000 | 125,000 | 91,000 | 52,000 | 140,000 | 147,500 | 145,000 | 140,500 | 149,000 |
| After equilibration of water absorption | Tensile strength | kg/cm$^2$ | 1,700 | 1,650 | 1,350 | 850 | 1,490 | 1,630 | 1,550 | 2,250 | 2,400 |
| | Flexural strength | kg/cm$^2$ | 2,560 | 2,400 | 2,100 | 1,100 | 2,180 | 2,470 | 2,400 | 3,480 | 3,750 |
| | Flexural modulus of elasticity | kg/cm$^2$ | 110,800 | 85,000 | 63,000 | 25,000 | 89,700 | 100,300 | 89,000 | 145,500 | 150,000 |
| | Water absorption rate | % | 1.38 | 1.42 | 1.70 | 2.10 | 1.63 | 1.56 | 1.59 | 0.65 | 0.30 |
| Dimensional change | | % | 0.80 | 0.85 | 0.90 | 1.20 | 0.70 | 0.69 | 0.69 | 0.60 | 0.25 |

TABLE 4

| Item | | Unit | Comparative Example 10 | Comparative Example 11 | Comparative Example 12 | Comparative Example 13 | Comparative Example 14 | Comparative 15 | Comparative 16 | Comparative 17 |
|---|---|---|---|---|---|---|---|---|---|---|
| Kind of polymer | | (WT %) | Ny66/Ny6 | Ny66/6T/6I | Ny6I/Ny66 | Ny66/6I | Ny6I | Ny66/6I | NMXD6/Ny66 | Ny66 |
| (Compositional ratio) | | | (70/30) Blend | (50/30/20) | (93/7) blend | (50/50) | | (80/20) | (90/10) blend | |
| ηr | | | 2.60 | 2.20 | 2.20 | 2.30 | 2.10 | 3.20 | 2.40 | 2.55 |
| Kind and amount of inorganic filler | | | GF 42% | GF 50% | GF 42% | GF 50% | GF 50% | GF 50% | GF 50% | CG 20% talc 11% calcined kaolin 13% |
| Appearance | Mold temperature 80° C. | gloss | 60 | 12 | 24 | 18 | 20 | Filling was impossible | 10 | 13 |
| | Mold temperature 120° C | gloss | 75 | 44 | 48 | 42 | 40 | Filling was impossible | 85 | 18 |
| Just after molding | Tensile strength | kg/cm$^2$ | 2,100 | 2,340 | 2,300 | 2,350 | 2,500 | 2,650 | 2,750 | 1,410 |
| | Flexural strength | kg/cm$^2$ | 3,100 | 3,420 | 3,250 | 3,500 | 3,800 | 3,850 | 3,990 | 2,100 |
| | Flexural modulus of elasticity | kg/cm$^2$ | 117,000 | 144,000 | 135,000 | 145,000 | 151,000 | 155,000 | 176,000 | 91,000 |
| After equilibration of water absorption | Tensile strength | kg/cm$^2$ | 1,400 | 1,960 | 2,200 | 1,900 | 2,450 | 2,430 | 2,490 | 1,060 |
| | Flexural strength | kg/cm$^2$ | 1,800 | 3,000 | 3,200 | 2,900 | 3,700 | 3,500 | 3,610 | 1,600 |
| | Flexural modulus of elasticity | kg/cm$^2$ | 60,000 | 143,500 | 137,000 | 144,000 | 150,000 | 159,000 | 176,000 | 59,000 |
| | Water absorption rate | % | 1.58 | 1.45 | 0.40 | 1.46 | 0.29 | 0.95 | 0.86 | 1.10 |
| Dimensional change | | % | 0.72 | 0.26 | 0.35 | 0.25 | 0.26 | 0.50 | 0.26 | 0.70 |

TABLE 5

| Item | | | Example 14 | Example 15 | Example 16 | Example 17 | Example 18 | Example 19 | Example 20 | Example 21 | Example 22 |
|---|---|---|---|---|---|---|---|---|---|---|---|
| Polyamide | | | | | | | | | | | |
| | | | Ny66/6I (80/20) | Ny66/6I (80/20) | Ny66/6I (80/20) | Ny66/6I (80/20) | Ny66/6I (80/20) | Ny66/6I (80/20) | Ny66/6I (80/20) | Ny66/6I (80/20) | Ny66/6I (80/20) |
| Relative viscosity | | | 2.35 | 2.30 | 2.40 | 2.41 | 2.38 | 2.33 | 2.40 | 2.20 | 2.40 |
| Carboxyl group ratio | | % | 74 | 79 | 80 | 80 | 79 | 75 | 80 | 85 | 80 |
| Amount of inorgainic filler | | wt % | GF33 | GF33 | GF33 | GF33 | GF33 | GF33 | GF33 | GF33 | GF33 |
| [Cu] | | (ppm) | 15 | 1 | 3 | 15 | 32 | 64 | 96 | 130 | 3 |
| [I]/[Cu] | | (gram atomic ratio) | 25 | 25 | 25 | 25 | 23 | 27 | 25 | 25 | 25 |
| [Mn] | | (ppm) | 10 | 10 | 10 | 10 | 10 | 10 | 10 | 10 | 30 |
| Just after molding | Tensile strength | (kg/cm$^2$) | 1,920 | 1,950 | 1,950 | 1,900 | 1,920 | 1,900 | 1,950 | 1,950 | 1,920 |
| | Flexural strength | (kg/cm$^2$) | 2,900 | 2,880 | 2,900 | 2,800 | 2,900 | 2,900 | 2,920 | 2,930 | 2,900 |

TABLE 5-continued

| Item | | | Example 14 | Example 15 | Example 16 | Example 17 | Example 18 | Example 19 | Example 20 | Example 21 | Example 22 |
|---|---|---|---|---|---|---|---|---|---|---|---|
| | Flexural modulus of elasticity | (kg/cm²) | 105,000 | 105,000 | 106,000 | 105,000 | 105,000 | 106,000 | 106,000 | 106,000 | 105,000 |
| After equilibration of water absorption | Tensile strength | (kg/cm²) | 1,720 | 1,750 | 1,770 | 1,710 | 1,730 | 1,700 | 1,710 | 1,730 | 1,750 |
| | Flexural strength | (kg/cm²) | 2,420 | 2,450 | 2,450 | 2,400 | 2,410 | 2,400 | 2,400 | 2,450 | 2,450 |
| | Flexural modulus of elasticity | (kg/cm²) | 95,000 | 96,000 | 96,000 | 95,000 | 96,000 | 97,000 | 96,000 | 96,000 | 95,000 |
| Appearance (mold temp. 80° C.) | | gloss | 88 | 89 | 87 | 87 | 89 | 88 | 87 | 90 | 86 |
| Dimensional change | | % | 0.64 | 0.64 | 0.64 | 0.65 | 0.64 | 0.65 | 0.63 | 0.63 | 0.64 |
| Light resistance | Appearance 1) | | ○ | ○ | ○ | ○ | ○ | ○ | ○ | ○ | ○ |
| | Discoloration 2) | | ⊙ | ⊙ | ⊙ | ⊙ | ⊙ | ○ | ○ | ○ | ⊙ |
| Thermal aging resistance | | Hr | 200 | 80 | 90 | 220 | 350 | 550 | 620 | 750 | 120 |

1) ○: No cracks occurred.
Δ: Cracks partially occurred.
x: Many cracks occurred.
2) ⊙: Substantially no change occurred.
○: Some change occurred.
Δ: Considerable change occurred.
x: Great change occurred.

TABLE 6

| Item | | | Comparative Example 20 | Comparative Example 21 | Comparative Example 22 | Comparative Example 23 | Comparative Example 19 | Comparative Example 20 | Comparative Example 21 |
|---|---|---|---|---|---|---|---|---|---|
| Polyamide | | | Ny66/6I (80/20) | Ny66/6I (80/20) | Ny66/6I (80/20) | Ny66/6I (80/20) | Ny66/6I (80/20) | Ny66/6I (80/20) | Ny66/6I (80/20) |
| Relative viscosity | | | 2.40 | 2.30 | 2.40 | 2.41 | 2.38 | 2.33 | 2.60 |
| Carboxyl group ratio | | % | 57 | 79 | 80 | 80 | 79 | 75 | 60 |
| Amount of inorganic filler | | wt % | CF33 | CF33 | CF33 | CF33 | GF33 | GF33 | GF33 |
| [Cu] | | (ppm) | 15 | 0 | 0 | 160 | 15 | 15 | 64 |
| [I]/[Cu] | | (gram atomic ratio) | 25 | 0 | 0 | 25 | 40 | 15 | 27 |
| [Mn] | | (ppm) | 10 | 0 | 10 | 10 | 10 | 10 | 10 |
| Just after molding | Tensile strength | (kg/cm²) | 2,000 | 1,900 | 1,930 | 1,900 | 1,950 | 1,920 | 1,920 |
| | Flexural strength | (kg/cm²) | 3,100 | 2,850 | 2,850 | 2,800 | 2,900 | 2,880 | 2,75 |
| | Flexural modulus of elasticity | (kg/cm²) | 160,000 | 105,000 | 105,000 | 106,000 | 106,000 | 106,000 | 92,000 |
| After equilibration of water absorption | Tensile strength | (kg/cm²) | 1,810 | 1,720 | 1,730 | 1,750 | 1,720 | 1,760 | 1,350 |
| | Flexural strength | (kg/cm²) | 2,620 | 2,400 | 2,420 | 2,420 | 2,400 | 2,450 | 2,150 |
| | Flexural modulus of elasticity | (kg/cm²) | 96,000 | 96,000 | 96,500 | 96,000 | 95,000 | 96,000 | 64,000 |
| Appearance (mold temp. 80° C.) | | gloss | 84 | 88 | 87 | 83 | 88 | 87 | 12 |
| Dimensional change | | % | 0.64 | 0.64 | 0.64 | 0.62 | 0.64 | 0.64 | 0.90 |
| Light resistance | Appearance 1) | | Δ | x | Δ | ○ | ○ | ○ | ○ |
| | Discoloration 2) | | Δ | ⊙ | ⊙ | x | Δ | Δ | ○ |
| Thermal aging resistance | | Hr | 70 | 30 | 50 | 820 | 250 | 130 | 450 |

1) ○: No cracks occurred.
Δ: Cracks partially occurred.
x: Many cracks occurred.
2) ⊙: Substantially no change occurred.
○: Some change occurred.
Δ: Considerable change occurred.
x: Great change occurred.

TABLE 7

| | | | Example 23 | Example 24 | Example 25 | Example 26 | Example 27 | Example 28 |
|---|---|---|---|---|---|---|---|---|
| Kind of polyamide | | | Ny66/6I (80/20) | Ny66/6I (80/20) | Ny66/6I (80/20) | Ny66/6I (80/20) | Ny66/6I (80/20) | Ny66/6I (80/20) |
| PPE 1) | | Part by weight | 10 | 25 | 33 | 43 | 25 | 33 |
| Mixing agent (C1) 2) | | wt % | 0 | 0 | 0 | 0 | 20 | 0 |
| Mixing agent (C2) 2) | | wt % | 0 | 0 | 0 | 0 | 0 | 30 |
| PPE + mixing agent | | Part by weight | 10 | 25 | 33 | 43 | 30 | 43 |
| Amount of GP filler 4) | | wt % | 33 | 33 | 33 | 33 | 33 | 33 |
| Just after molding | Tensile strength | (kg/cm²) | 1,900 | 1,850 | 1,800 | 1,700 | 1,920 | 2,070 |
| | Flexural strength | (kg/cm²) | 2,880 | 2,850 | 2,700 | 2,610 | 2,900 | 2,950 |

TABLE 7-continued

|  |  |  |  |  |  |  |  |  |
|---|---|---|---|---|---|---|---|---|
|  | Flexural modulus of elasticity | (kg/cm²) | 110,000 | 110,000 | 100,000 | 93,000 | 112,000 | 115,000 |
| After equilibration of water absorption | Tensile strength | (kg/cm²) | 1,780 | 1,800 | 1,770 | 1,660 | 1,850 | 1,950 |
|  | Flexural strength | (kg/cm²) | 2,600 | 2,700 | 2,650 | 2,580 | 2,740 | 2,850 |
|  | Flexural modulus of elasticity | (kg/cm²) | 105,000 | 106,000 | 98,000 | 91,000 | 110,000 | 111,000 |
| Appearance (mold temp. 80° C.) | | gloss | 83 | 85 | 88 | 87 | 89 | 85 |
| Dimensional change | | % | 0.55 | 0.53 | 0.50 | 0.48 | 0.53 | 0.51 |
| Weld strength (kg/cm²) | | (kg/cm²) | 600 | 590 | 560 | 500 | 700 | 720 |
| Transmission[5] | | | ⊚ | ⊚ | ⊚ | ⊚ | ○ | ⊚ |

|  |  |  | Example 29 | Example 30 | Comparative Example 27 | Comparative Example 28 | Comparative Example 29 |
|---|---|---|---|---|---|---|---|
| Kind of polyamide | | | Ny66/6I (80/20) | Ny66 | Ny6 | Ny6 | Ny66/6I (80/20) |
| PPE[1] | | Part by weight | 33 | 0[3] | 33 | 33 | 100 |
| Mixing agent (C1)[2] | | wt % | 0 | 0 | 0 | 0 | 20 |
| Mixing agent (C2)[2] | | wt % | 30 | 100 | 30 | 30 | 0 |
| PPE + mixing agent | | Part by weight | 43 | 33 | 43 | 43 | 100 |
| Amount of GP filler[4] | | wt % | 33 | 33 | 33 | 33 | 33 |
| Just after molding | Tensile strength | (kg/cm²) | 2,300 | 1,980 | 2,000 | 1,780 | 1,720 |
|  | Flexural strength | (kg/cm²) | 3,300 | 2,800 | 2,900 | 2,520 | 2,630 |
|  | Flexural modulus of elasticity | (kg/cm²) | 160,000 | 112,000 | 102,000 | 95,200 | 94,000 |
| After equilibration of water absorption | Tensile strength | (kg/cm²) | 2,200 | 1,900 | 1,450 | 1,220 | 1,680 |
|  | Flexural strength | (kg/cm²) | 3,150 | 2,730 | 2,400 | 2,150 | 2,600 |
|  | Flexural modulus of elasticity | (kg/cm²) | 162,000 | 110,000 | 87,000 | 65,000 | 93,000 |
| Appearance (mold temp. 80° C.) | | gloss | 80 | 85 | 8 | 68 | 45 |
| Dimensional change | | % | 0.40 | 0.49 | 0.85 | 0.65 | 0.40 |
| Weld strength (kg/cm²) | | (kg/cm²) | 750 | 800 | 600 | 570 | 470 |
| Transmission[5] | | | ⊚ | ⊚ | x | x | ○ |

[1] Amount per 100 parts by weight of polyamide resin.
[2] Wt % based on PPE resin.
[3] 33 parts by weight of maleic acid-modified PPE resin was used in place of PPE resin.
[4] Amount based on the resin composition.
[5] ⊚: The water surface was clearly seen.
○: The water surface was somewhat seen.
x: The water surface was not utterly seen.

What is claimed is:

1. A polyamide resin composition which comprises: (A), as a polyamide component, 30–95% by weight of a polyamide resin which is a half-aromatic polyamide comprising (a) 70–95% by weight of hexamethyleneadipamide unit obtained from adipic acid and hexamethylenediamine and (b) 5–30% by weight of hexamethyleneisophthalmide unit obtained from isophthalic acid and hexamethylenediamine and which has a sulfuric acid solution viscosity $\eta r$ of 1.5–2.8 and (B) 5–70% by weight of at least one inorganic filler selected from glass fiber, carbon fiber, mica, talc, kaolin, wollastonite, calcium carbonate and potassium titanate.

2. A polyamide resin composition according to claim 1, wherein the polyamide has a terminal carboxyl group ratio of 65% or more and further contains a mixture of a copper compound and an iodine compound and/or a manganese compound at a ratio which satisfies the following formulas (1)–(3):

$$0.5 \text{ ppm} \leq \text{copper} \leq 150 \text{ ppm} \quad (1)$$

$$20 \leq \text{iodine/copper} \leq 30 \text{ (gram atomic ratio)} \quad (2)$$

$$0.5 \text{ ppm} \leq \text{manganese} \leq 60 \text{ ppm}. \quad (3)$$

3. A polyamide resin composition according to claim 1, which additionally contains a polyphenylene ether resin in an amount of 5–80 parts by weight per 100 parts by weight of the polyamide resin.

4. A molded article excellent in surface gloss which is made from the polyamide resin composition defined in claims 1, 2 or 3.

* * * * *